United States Patent [19]

Kiefer et al.

[11] Patent Number: 4,933,564
[45] Date of Patent: Jun. 12, 1990

[54] METHOD OF DETERMINING RADIATION DOSES BY EVALUATING NUCLEAR TRACKS IN IRRADIATED AND SUBSEQUENTLY ETCHED FOILS

[75] Inventors: Hans Kiefer, Leopoldshafen; Bernd Reinhardt, Karlsruhe; Gotthard Schleicher, Sinsheim-Rohrbach; Manfred Urban, Karlsruhe, all of Fed. Rep. of Germany

[73] Assignee: Kernforschungszentrum Karlsruhe GmbH, Karlsruhe, Fed. Rep. of Germany

[21] Appl. No.: 356,792

[22] Filed: May 25, 1989

[30] Foreign Application Priority Data

May 25, 1988 [DE] Fed. Rep. of Germany ....... 3817659

[51] Int. Cl.⁵ ............................................. G01N 27/22
[52] U.S. Cl. ................................ 250/473.1; 250/472.1
[58] Field of Search ........................... 250/472.1, 473.1; 204/129.2, 129.4, 129.43; 430/326; 156/345, 626

[56] References Cited

U.S. PATENT DOCUMENTS

| | | | |
|---|---|---|---|
| 4,028,207 | 6/1977 | Faktor et al. | 204/195 R |
| 4,157,473 | 6/1979 | Sohrabi | 250/473.1 |
| 4,330,710 | 5/1982 | Tommasino et al. | 250/472.1 |
| 4,648,950 | 3/1987 | Hankins | 204/129.4 |

FOREIGN PATENT DOCUMENTS 1085728 4/1984 U.S.S.R. ............................ 204/129.2

Primary Examiner—Constantine Hannaher
Assistant Examiner—Edward J. Glick
Attorney, Agent, or Firm—Spencer & Frank

[57] ABSTRACT

A method of determining radiation doses by evaluation of nuclear tracks in an irradiated foil of track recording material through the use of an electrochemical etching cell which is subdivided into two chambers by the foil with the irradiated side of the foil contacted by a mixture of an etchant and a solvent and the opposite side of the foil contacted by an electrolyte and with a first electrode immersed into the mixture and a second immersed into the electrolyte, the method including the steps of: (a) applying an alternating voltage across the two electrodes establishing an electric field through the foil; (b) etching the nuclear tracks by selective exposure to the mixture for a given period of time in the presence of the electric field; (c) continuously recording the electrical capacitance between the electrodes during the performance of step (b); and (d) comparing the electrical capacitance reached after a given etching time with a calibrated value for obtaining a measure for the radiation dose.

3 Claims, 2 Drawing Sheets

METHOD OF DETERMINING RADIATION DOSES BY EVALUATING NUCLEAR TRACKS IN IRRADIATED AND SUBSEQUENTLY ETCHED FOILS

CROSS REFERENCE TO RELATED APPLICATION

This application claims the priority of Federal Republic of Germany Application No. P 38 17 659.9, filed May 25th 1988, which is incorporated herein by reference.

BACKGROUND OF THE INVENTION

The present invention relates to methods of determining radiation dosages by the evaluation of foil exposed to radiation. More specifically, the present invention relates to etching of the foil subsequent to exposure.

Various methods exist for the evaluation of foils irradiated by nuclear radiation. One common method determines radiation dosage by evaluation of nuclear tracks in an irradiated foil of track recording material through the use of subsequent chemical etching of the tracks. A second method relies upon electrochemical etching of the tracks in a cell which is subdivided into two chambers by the foil provided with the nuclear tracks, with the irradiated side of the foil being contacted by a mixture of an etchant and a solvent and the other side by an electrolyte and an electrode being immersed into each one of the liquids. An alternating voltage is applied to the two electrodes for etching the nuclear tracks so as to enlarge them by selective exposure to the attack of the mixture of etchant and solvent for a given period of time. The first conventional etching method is described in detail by Robert L. Fleischer et al in "Nuclear Tracks in Solids", University of California Press, 1975, pages 50 et seq., and a known electrochemical etching method in Bericht KfK-3805 [KfK Report No. 3805], September 1985, by Kernforschungszentrum Karlsruhe, Federal Republic of Germany, particularly pages 22 to 32.

After the tracks have been etched, the tracks are optically counted. The evaluation of the exposure is based on the optical track count.

It is a disadvantage of the methods taught in the prior art that the evaluation of irradiated foils requires two time consuming steps, namely the etching (nuclear track enlargement) and the subsequent optical counting of the nuclear tracks.

SUMMARY OF THE INVENTION

It is an object of the invention to eliminate the above-outlined disadvantage by providing an improved method of determining radiation doses by evaluation of nuclear tracks etched into an irradiated foil of track recording material with the use of an electrochemical etching cell.

This object and others, to become apparent as the specification progresses, are accomplished by the invention, according to which, briefly stated, the electrical capacitance of the etching cell during the etching process is continuously recorded; and the electrical capacitance reached after a given etching time as determined according to a calibration standard is utilized as a measure for the radiation dose by comparing it with a calibrated value.

The method considerably reduces the time required for evaluation since the radiation dose to be determined is already available at the end of the etching process, thus eliminating subsequent counting. Moreover, the etching process is continuously monitored increasing the evaluation reliability. The evaluation may be automated. With a minimum of labor, the method permits the economical, time saving and reliable simultaneous evaluation of a large number of nuclear track detectors (foils) for determination of the respective radiation exposure doses.

DESCRIPTION OF THE PREFERRED EMBODIMENTS

Figure 1:
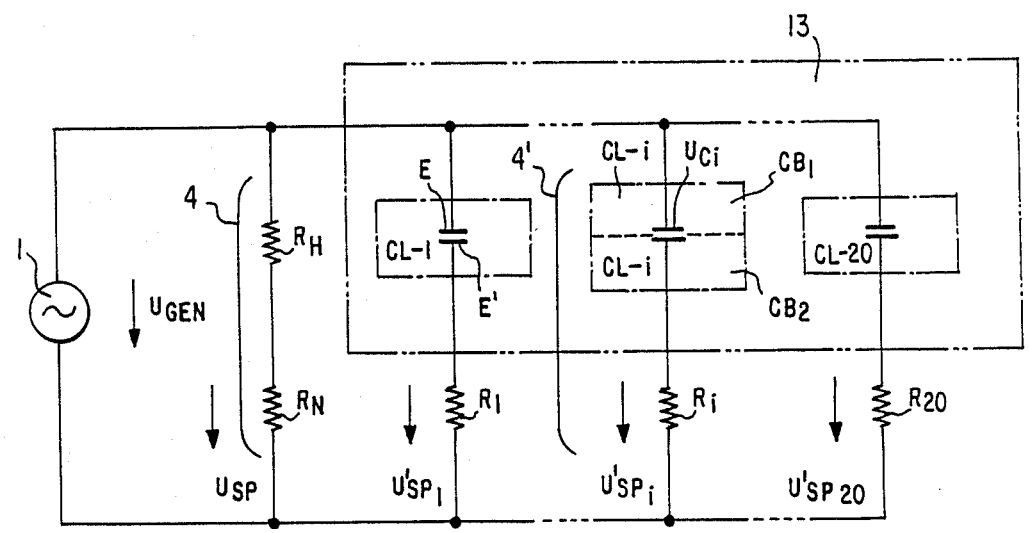
FIG. 1 is an electrical circuit diagram of the etching system.
Figure 2:
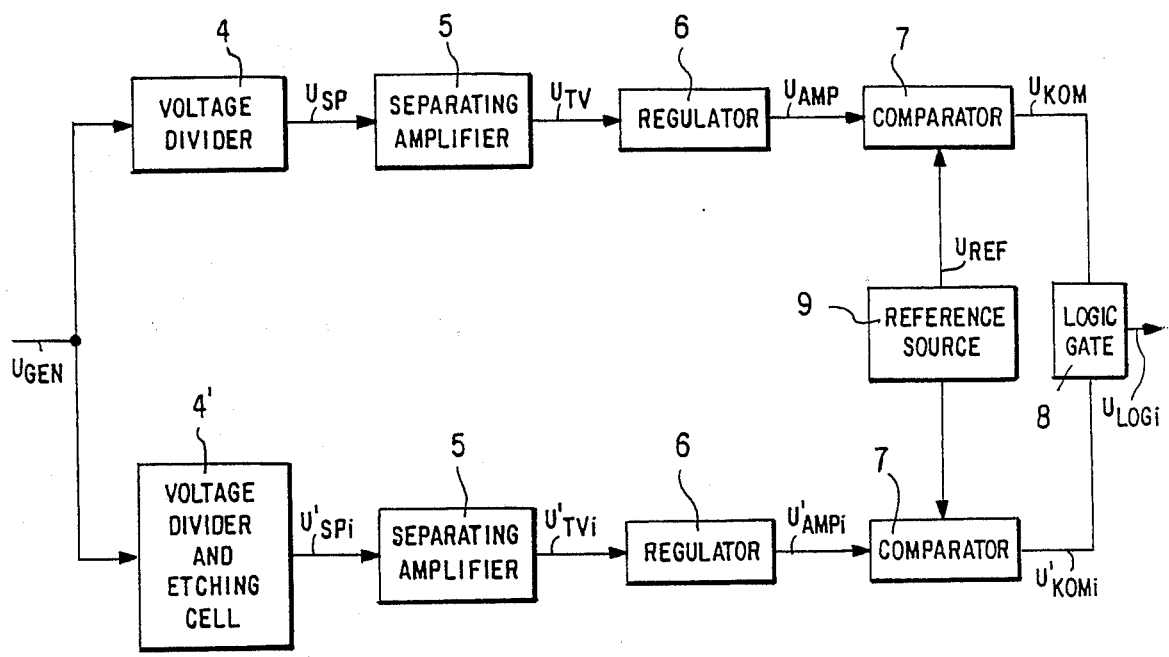
FIG. 2 is a block circuit diagram of the capacitance measuring circuit for the etching system.

In the description that follows, a measuring system for the continuous measurement of the detector capacity during the electrochemical etching process will be set forth in conjunction with FIGS. 1 and 2.

FIG. 1 illustrates a number of etching cells CL-1 through CL-20 connected in parallel across an alternating generator 1 which provides voltage $U_{Gen}$. It is not necessary that a number of cells be run in parallel, one cell may be run individually. If the cells are run together, as illustrated, the group of cells can be referred to as a cell packet 13.

Each cell consists of two chambers, $Cb_1$ and $Cb_2$, divided by an exposed foil. The chamber $Cb_1$ contains a mixture of an etchant and a solvent, while the other chamber $Cb_2$ contains an electrolyte. Electrodes E and E' are inserted into the mixture and the electrolyte, respectively, and are utilized to provide a voltage to the respective cell to measure the capacitance of the cell through the etched foil, and to continually measure the capacitance of the cell during etching.

The etching voltage $U_{Ci}$ of the etching cell CL-i and its frequency must be variable so as to be selectable in accordance with the type of foil material being etched. The etching device of the present invention is therefore designed to operate at etching voltages from 500 to 1000 V and at frequencies from 500 to 5000 Hz. The adjustable range is achieved by utilizing the principle of phase shifts in an RC member.

A resistor $R_i$ is connected in series with an etching cell CL-i. In order to determine the capacitance of cell CL-i, the phase shift between $U_{Ci}$ and $U_{Gen}$ is measured by zero cross detection in the generator voltage $U_{Gen}$ and in the partial voltage $U_{sp}$ across resistor $R_N$ as well as voltage $U'_{spi}$ across resistor $R_i$, respectively. The zero point detection signal is picked up at high voltage dividers 4 and 4' illustrated in FIGS. 1 and 2. The value of resistor $R_i$ must be known since it influences the phase shift.

As illustrated in FIG. 2, the voltage dividers 4 and 4' supply signals $U_{sp}$ and $U'_{spi}$ from $U_{Gen}$ to amplifier 5. The signals $U_{sp}$ and $U'_{spi}$ are separated galvanically by means of separating amplifiers 5 producing signals $U_{tv}$ and $U'_{tvi}$. Thereafter, the amplitudes are regulated at the amplitude control regulator 6 so that identical amplitude level of signals $U_{amp}$ and $U'_{ampi}$ are fed to comparators 7. Finally, the two signals, $U'_{kom}$ and $U_{komi}$ are logically linked at comparator 8.

As an example, the voltage across each of the etching cells CL-1, ... CL-i, ... CL-20 is in the order of 1 kV, depending on the voltage range (of 10 to 1900 V) of the etching generator. The voltage of the etching cell CL-i is calculated as follows:

$$U_{Ci} = U_{Gen} \cdot \sin \Phi_i$$

The phase angle or shift $\Phi_i$ between $UC_i$ and $U_{gen}$ should be $<30°$.

The calculated phase angle is inserted into the following equation:

$$\Phi_i = \arctan \frac{1}{2\pi \cdot f \cdot R_i \cdot (C_{Fi} + C_p)}$$

The capacitance $C_i$ of etching cell CL-i is $$C_i = C_{Fi} + C_p$$

where $C_p$ is the capacitance of the non-irradiated foil and $C_{Fi}$ is the additional capacitance due to the foil being irradiated. The angle should be less than or equal to 30°, since with increasing angle the change $\Delta\Phi_i$ becomes less, at a given change $\Delta C_{Fi}$. With the above equation, the resistance is dimensioned to be $R_i = 3M\Omega$. For the voltage divider in the zero point detection of the generator the resistance $R_N + R_H$ is selected to equal 10 M$\Omega$ for maintaining the power loss low. Resistances $R_i$ and $R_N$, respectively, at which the signals are picked up, result from the maximum permissible signal voltage.

To prevent destruction of the instruments upon the occurrence of short circuits and possible interference on the high voltage side, the signals are galvanically separated by an isolation (buffer) amplifier 5, incorporating a miniature hybrid transformer. It is designed for a maximum isolation voltage of 3500 V d.c.

One high voltage divider 4 and one buffer amplifier 5 and associated circuitry can be incorporated in the same metal housing. Due to the high-intensity electric field surrounding the amplifier 5, a metal wall is inserted between the voltage divider 4 and the buffer amplifier 5 if housed together. The terminals for the high voltage are inserted into the housing in an insulated manner.

With the appropriate selection of the electrical reference point, signals can be detected, in principle, without the use of a buffer amplifier.

The capacitance of the etching cells increases during the electrochemical etching process, and thus the voltage changes across resistors $R_1, ... R_i, ... R_{20}$. In each case this results in a change in the amplitude of the signals $U'_{sp1} ... U'_{spi} ... U'_{sp20}$ to be detected.

Comparators 7 do not detect the signal precisely at its zero passage; rather, they compare it with an adjustable reference voltage $U_{ref}$ supplied from reference source 9. Different amplitudes of the signals $U_{amp}$ and $U'_{amp}$ at a given reference voltage produce a time difference in the switching times of the comparators 7. This necessitates amplitude regulation by the amplitude control regulator 6 which can be comprised of a variable amplitude control, a peak value measurement and a comparator.

The input signal of comparator 7 may be superimposed by interfering voltages and noise. Therefore, ground potential is not used as a reference for the comparators. A reference voltage source 9 generates a voltage which can be set from 0 to 100 mV.

Logic gate 8 is an exclusive-OR gate producing a signal $U_{logi}$ having a pulse duration $t_{zi}$ based on the inputs $U_{kom}$ and $U'_{komi}$. The pulse duration $t_{zi}$ of the exclusive-OR signals $U_{logi}$ is measured and used to calculate the phase angle $\phi_i$ as follows:

$$\Phi_i = 2\pi f t_{zi},$$

where f is the frequency of the etching voltage $U_{gen}$. If the angle $\Phi_i$ is inserted into the equation below, the sum of the capacitances $C_p$ and $C_{Fi}$ results as follows:

$$C_i = C_p + C_{Fi} = \frac{1}{2\pi \cdot f \cdot R_i \cdot \tan\Phi_i}$$

By forming the difference between the irradiated and the non-irradiated detectors, a consideration of $C_p$ is no longer required. The measured values are sampled at selectable time intervals and are automatically averaged, for example, every 100 measured values, by a universal counter.

The conventional electrochemical etching method can be performed methodically through the teachings of the present invention. The phase shift is measured once at the end of the etching period and thus the final capacitance of the etching cell or cells is determined.

Other possibilities for measuring the capacitance are also possible, for example measurements by means of a capacitance measuring bridge.

Figure 3:
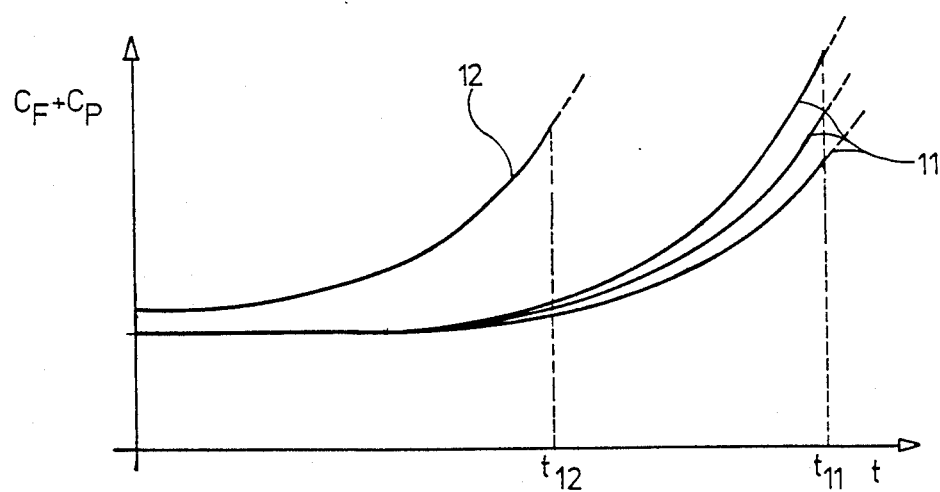
FIG. 3 shows the development of the etching cell capacitance during etching.

FIG. 3 shows qualitative curves 11 for three etching cell capacitances during simultaneous etching over the etching time $t_{11}$, with the higher radiation dose being associated with the uppermost of the three curves 11. During the time period recorded for the etching cell capacitance according to curve 12, a foil is etched which, for example, had been exposed to lower energy radiation than the foils according to curves 11. In this case, the predetermined etching time $t_{12}$ becomes shorter than $t_{11}$.

Through comparison of measured capacitance curves with standardized curves for foils of known exposure, the extent of exposure can be determined from the measured capacitance. This eliminates the need for optical counting and evaluation subsequent to etching. The exposure can be determined during etching by analysis of the capacitance curve while it is being formed.

It will be understood that the above description of the present invention is susceptible to various modifications, changes and adaptations, and the same are intended to be comprehended within the meaning and range of equivalents of the appended claims.

We claim:

1. A method of determining radiation doses by evaluation of nuclear tracks in an irradiated foil of track recording material with the use of an electrochemical etching cell which is subdivided into two chambers by said foil with the irradiated side of the foil contacted by a mixture of an etchant and a solvent and the opposite side of said foil contacted by an electrolyte and with a first electrode immersed into said mixture and a second electrode immersed into said electrolyte, the method comprising the steps of:

(a) applying an alternating voltage across said two electrodes establishing an electric field through said foil;

(b) etching said nuclear tracks by selective exposure to said mixture for a given period of time in the presence of said electric field;

(c) continuously recording the electrical capacitance between said electrodes during the performance of step (b); and (d) comparing said electrical capacitance reached after a given etching time with a calibrated value for obtaining a measure for the radiation dose.

2. A method as defined in claim 1, further comprising the steps of:

connecting a resistor in series with said electrodes, comparing the phase of the voltage through said resistor with the phase of the voltage of said alternating voltage source to derive a relative phase position, and utilizing the relative phase position after the given etching period as a measure for the nuclear radiation dose.

3. A method as defined in claim 2, further comprising the steps of:

combining a plurality of etching cells into an etching packet connecting said cells in parallel to an alternating voltage source, and continuously comparing the alternating voltage across the resistors connected in series with the respective etching cells with the voltage source relative to its phase position.

* * * * *